Patented Apr. 22, 1952

2,594,144

UNITED STATES PATENT OFFICE 2,594,144

METHOD OF PREPARATION OF AROMATIC LINEAR POLYESTERS

Paul J. Flory, Ithaca, N. Y., and Frederick S. Leutner, Cuyahoga Falls, Ohio, assignors to Wingfoot Corporation, Akron, Ohio, a corporation of Delaware No Drawing. Application January 22, 1949, Serial No. 72,256

10 Claims. (Cl. 260—75)

This invention relates to a novel method of preparing superpolyesters which are unusually well adapted to drawing fibers and which have improved heat stability. More specifically the invention relates to polyesters made by the condensation of terephthaloyl chloride

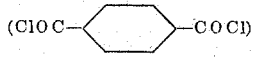

or isophthaloyl chloride

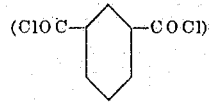

with tetramethylene glycol.

In copending application Serial No. 695,056, filed September 5, 1946, now abandoned, there is described and claimed a particular polymer, tetramethylene terephthalate, which has an unusually high melting point and is therefore particularly useful in the preparation of desirable fibers. These fibers can be cold drawn to develop high tensile strength and low residual elongation.

Copending application Serial No. 760,690, filed July 12, 1947, describes and claims tetramethylene isophthalate, another high melting polyester capable of forming fibers.

Copending application Serial No. 683,990, filed July 16, 1946, now Patent 2,589,688 issued March 18, 1952, describes and claims methods of preparing superpolyesters by an improved process involving the use of certain aromatic dibasic acid chlorides and glycols, whereby very high molecular weight compositions may be obtained in relatively short reaction periods. In this method, the polyesters are prepared by condensing a glycol with a dibasic acid chloride with the elimination of hydrogen chloride. While it is possible to prepare tetramethylene terephthalate and tetramethylene isophthalate of very high molecular weight by this method, it has been found that, at the high temperatures used to complete the reaction, there is some tendency for unreacted glycol to decompose and for side reactions to take place with some discoloration of the product. These effects may be reduced by efficient removal of the hydrogen chloride from the reaction system but it is difficult to eliminate them entirely. The solution of this problem is one of the principal objects of the present invention. Other objects will be apparent from the description of the invention hereinafter set forth.

It has been found that, in the condensation of tetramethylene glycol with terephthaloyl chloride or isophthaloyl chloride, the decomposition of the tetramethylene glycol and the undesired side reactions may be minimized substantially by using a small proportion of a higher molecular weight glycol which is more stable under the rigorous conditions required to complete the condensation of the superpolyester. For example, tetramethylene glycol in an amount equal to from 85 to 99 mol percent, and preferably 90 to 98 mol percent, of the acid chloride is preliminarily reacted with the acid chloride and the reaction is then completed with a higher molecular weight glycol in an amount approximately equal to the molecular excess of acid chloride used in the first stage. The preferred practice utilizes a two to ten mol percent deficiency of tetramethylene glycol in the first stage of the reaction and subsequently the same molecular amount of the higher glycol to complete the condensation.

The first stage of the reaction is represented by the equation

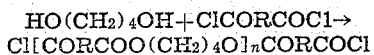

to give a low molecular weight polyester having terminal acid chloride radicals where $n$ is a whole integer from 6 to 99 (and preferably 9 to 50) and —CORCO— is a terephthaloyl or isophthaloyl radical. The second stage of the condensation is represented by the equation

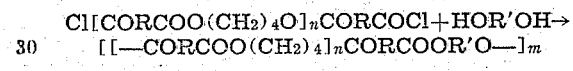

giving the final high molecular weight polyester with number average molecular weights in the range of 15,000–40,000, in which R' is an aliphatic hydrocarbon, oxahydrocarbon or thiohydrocarbon radical having more than four atoms in the chain between the —O-atoms, and $m$ is a whole number less than 15 and preferably between 10 and 2.

The higher glycols used in the second stage of the reaction are the aliphatic hydrocarbon, oxahydrocarbon and thiohydrocarbon glycols having more than four atoms in the connecting chain between the hydroxyl groups, including cyclo-aliphatic glycols. Straight chain glycols are preferred and the polymethylene glycols are particularly useful. Representative examples are pentamethylene glycol, hexamethylene glycol, decamethylene glycol, diethylene glycol, triethylene glycol, tetraethylene glycol, di(betahydroxyethyl) sulfide (HO—$C_2H_4$—S—$C_2H_4$—OH), 33'-dihydroxy dipropyl sulfide (HO—$C_3H_6$—S—$C_3H_6$—OH)

3,6-dithia-1,8-dihydroxy octane

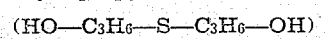

and 1,4-cyclohexane diol.

In accordance with this invention, superpolyesters are prepared by charging an autoclave, preferably of glass or lined with glass, with the required proportions of acid chloride and tetramethylene glycol, an excess of the acid chloride being used. In order to prevent the decomposition of the polymer at the reaction temperatures, it is necessary to sweep out the reaction vessel with a stream of nitrogen, or other inert gas, prior to initiating the reaction. Such treatment completely eliminates all oxygen which may have been initially present in the reaction vessel. It is also desirable to continue flowing the stream of inert gas through the vessel during the course of the reaction for the purpose of maintaining the reaction vessel free of gaseous oxygen and for eliminating the hydrogen chloride generated by the condensation reaction. The reaction vessel is also provided with a suitable means for applying a vacuum to the reaction mass for removing bubbles of gas from the viscous polymer. After a short preliminary heating period at temperatures above the melting point of the reaction mixture, followed by a further short heating period at 200–250° C., a low molecular weight polymer is obtained.

The course of the reaction may be followed by periodically measuring the viscosity of the reaction mass by the use of a glass tube inserted through the walls of the reaction vessel and adapted to be immersed in the molten reaction mass. The method of measuring the melt viscosity by which the course of the reaction is followed is fully described in the Journal of the American Chemical Society, volume 62, page 1057.

The second step of the reaction involves the addition of a proportion of a glycol having a chain of more than four atoms between the two hydroxyl groups, which proportion is approximately equivalent to the molecular excess of acid chloride used in the first step of the reaction. In the event that any of the acid chloride or tetramethylene glycol is lost during the first step of the reaction, it will be necessary to add more or less of the higher glycol in order that there may be present in the final reaction mass as nearly equimolecular proportions as possible of the dibasic acid units and total glycol units. There are several methods which may be used to assure the presence of equivalent proportions of reactants in the vessel during the final step of the reaction. It may be done by trial-and-error method whereby, over the course of many preparations, the proportion of added material required to produce the maximum viscosity is learned. The same objective may be obtained by increment addition of the higher molecular weight glycol, by which method small proportions of the higher glycol are added and measurements of the melt viscosity made subsequent to the addition of each increment, the reaction being completed when a desirable high molecular weight polyester is found to exist.

The preferred method of estimating the proportion of higher glycol required to complete the reaction involves the use of a standardized method for performing the first step of the reaction and estimating the required proportion of additional glycol from the melt viscosity of the mass at the end of the first stage of reaction. This latter method requires the use of a plotted curve showing the relationship of melt viscosity to excess of acid chloride, which curve is prepared after a series of carefully controlled experiments involving accurately measured proportions of reagents.

According to an alternate method which may be used in the practice of this invention, the molten acid chloride is charged into the reaction vessel and the tetramethylene glycol is then fed into the mass of molten acid chloride in small portions or continuously until the intermediate polymer of desired viscosity is obtained. This method involves the use of apparatus provided with a glycol inlet at the bottom of the autoclave, which may be the same inlet used to deliver the inert gas to the reaction vessel. In accordance with this method the reaction vessel is flushed out with inert gas and charged with acid chloride. The reaction is initiated by introducing tetramethylene glycol into the acid chloride through the gas inlet tube while maintaining a continuous or intermittent flow of the inert gas into the vessel. The temperature is gradually raised so as to maintain the reactants in molten condition. When the temperature has reached a maximum of 230–250° C. the reaction mass soon reaches a maximum viscosity, the value of which will depend upon the extent of the acid chloride excess, the smaller excess producing the more viscous product. The excess of acid chloride at this time may be estimated by any of the methods described in the preceding paragraphs, and this required amount of higher glycol is carefully added through the inlet tube to secure a polyester having a melt viscosity between 1000 and 5000 poises.

The first stage of the reaction is preferably started at a relatively low temperature, which is gradually increased as the reaction proceeds in order to keep the reaction mass melted. The completion of this first stage is facilitated by finally heating for a short time at a temperature of about 200–250° C. The second stage of the reaction, using the higher glycol, is carried out entirely at the higher temperatures required to keep the reaction mass melted, for example, at about 240–255° C. The time required for the second stage will, of course, vary with the molecular weight desired in the product but will usually be about one to two hours.

The periodic determination of the melt viscosity, used in following the progress of the reaction, may also be used in estimating the molecular weight of the polymer. The average molecular weight M is related to the melt viscosity in accordance with the empirical equation $\log N = A + BM^{1/2}$ wherein N is the melt viscosity in poises and A and B are constants depending upon the particular reagents being used. These constants can be established by measuring the viscosity of several polymers of known molecular weights.

It is important to employ pure reactants in either method of preparing the polyesters. The tetramethylene glycol can be purified satisfactorily by crystallization from a 2:3 mixture of dry acetone and dry ether. The freezing point is a good criterion of the purity of the glycol. The freezing point of the tetramethylene glycol should be at least 19.5° to be assured of its purity (although a lower freezing point can be tolerated with certain types of impurities), and preferably it should be in the range 19.8° to 20.2° C. The terephthaloyl chloride can be purified conveniently by re-crystallizing it from dry petroleum ether. Its purity is well assured if it melts sharply from 83.5 to 84.5° C. The isophthaloyl chloride can be purified by successive crystallization of the distilled acid chloride from dry hexane or petroleum ether. Its melting point should be at least 45–46° C. Both the acid chloride and the glycol should be carefully protected from moisture.

The condensation superpolymers of tetramethylene terephthalate and tetramethylene isophthalate, modified in accordance with this invention by the completion of the reaction with a higher molecular weight glycol, are valuable sources of synthetic textile fibers which can be made by spinning or extruding the liquefied polymer through suitable dies. The extruded filaments are then solidified. The filaments so prepared may be strengthened and rendered less thermoplastic by subjecting them to stretching action which causes a molecular orientation. Such orientation of the fibers by stretching is conducted at temperatures below the softening points and is usually called "cold-drawing."

The oriented or cold-drawn fibers may be twisted into thread or yarn, or used in single-filament form, in the preparation of textile fabrics. The filaments may also be used as bristles in the fabrication of various types of brushes.

Further illustrative details of the preparation of the new polyesters are set forth in the following examples:

Example 1

A glass reaction vessel provided with an adjustable glass inlet tube and a stirring device was charged with 46.1 parts by weight of pure terephthaloyl chloride. While vigorously stirring the terephthaloyl chloride, 19.4 parts by weight of pure tetramethylene glycol were added gradually over a period of 75 minutes. During the reaction a continuous stream of nitrogen was introduced into the reaction mass by means of the glass tube, the end of which was immersed in the molten reactants. The temperature at the outset was that required to melt the terephthaloyl chloride and the temperature was raised gradually so as to maintain the reaction mass in molten condition. After all of the glycol had been added the temperature was 237° C., which temperature was maintained for an additional 45 minutes while the vessel was evacuated to remove gas bubbles and dissolved hydrogen chloride. At this point the melt viscosity was 58 poises, corresponding to the molecular weight of 7500. A portion of decamethylene glycol (1.071 parts by weight) equivalent to the 2.7 molar percent excess of terephthaloyl chloride (determined empirically from the viscosity) was added in three separate portions while continuously stirring the reaction mass. After heating the reaction mass for two hours it was found to have a viscosity of 2500 poises and a molecular weight of 22,000. On cooling, the polymer crystallized to a white solid having a melting point of 222–223.5° C., which was less than 4° C. below the melting point of a tetramethylene terephthalate unmodified by the addition of decamethylene glycol.

Example 2

Using the apparatus and procedure set forth in Example 1, 16.0 parts by weight of tetramethylene glycol and 37.5 parts by weight of terephthaloyl chloride were reacted for 95 minutes while gradually increasing temperatures from 82° C. to 218° C., the glycol being added slowly as in Example 1. The reaction mixture was then heated for 40 minutes at 237° C. with the application of vacuum to remove gaseous reaction products. At this time the melt viscosity was 2.7 poises, corresponding to a molecular weight of about 1300. Then 2.525 parts by weight of decamethylene glycol, corresponding to 7.8 molar percent excess of terephthaloyl chloride, indicated by the viscosity, were added over a period of 210 minutes. After further heating for 90 minutes, the polymer was found to have a viscosity of 1500 poises, corresponding to a molecular weight of 20,000. The resulting polymer was a white crystalline solid having a melting point of 214.5–217° C. It was drawn into excellent fibers capable of being cold drafted.

Isophthaloyl chloride and other glycols than decamethylene glycol may be used similarly.

While certain representative embodiments and details have been shown for the purpose of illustrating the invention, it will be apparent to those skilled in this art that various changes and modifications may be made therein without departing from the spirit or scope of the invention.

We claim:

1. A method of preparing a superpolyester which comprises mixing and heating a dibasic acid chloride selected from the group consisting of terephthaloyl chloride and isophthaloyl chloride with from 85 to 99 percent of an equivalent proportion of tetramethylene glycol at a temperature above the melting point of the reaction mass until a viscous polyester is formed, adding to this polyester, in an amount approximately equivalent to the excess of acid chloride, a glycol selected from the group consisting of aliphatic hydrocarbon, oxahydrocarbon and thiahydrocarbon glycols having more than four atoms in the molecule chain between the hydroxyl groups, and continuing the heating at temperatures above the melting point of the reaction mass until a high molecular weight superpolyester is formed.

2. A method of producing a superpolyester which comprises heating terephthaloyl chloride with from 85 to 99 percent of an equivalent proportion of tetramethylene glycol to form a linear polyester having terminal acid chloride radicals and then heating said linear polyester, in a molten condition, with a different glycol in an amount approximately equivalent to the excess of terephthaloyl chloride, said latter glycol being selected from the group consisting of aliphatic hydrocarbon, oxahydrocarbon and thiahydrocarbon glycols having more than four atoms in the molecule chain between the hydroxyl groups, to form a superpolyester.

3. A method of producing a superpolyester which comprises heating isophthaloyl chloride with from 85 to 99 percent of an equivalent proportion of tetramethylene glycol to form a linear polyester having terminal acid chloride radicals and then heating said linear polyester, in a molten condition, with a different glycol in an amount approximately equivalent to the excess of isophthaloyl chloride, said latter glycol being selected from the group consisting of aliphatic hydrocarbon, oxahydrocarbon and thiahydrocarbon glycols having more than four atoms in the molecule chain between the hydroxyl groups, to form a superpolyester.

4. A method of producing a superpolyester which comprises heating terephthaloyl chloride with from 85 to 99 percent of an equivalent proportion of tetramethylene glycol to form a linear polyester having terminal acid chloride radicals and then heating said linear polyester, in a molten condition, with decamethylene glycol in an amount approximately equivalent to the excess of terephthaloyl chloride to form a superpolyester.

5. A method of producing a superpolyester which comprises heating isophthaloyl chloride with from 85 to 99 percent of an equimolecular proportion of tetramethylene glycol to form a linear polyester having terminal acid chloride radicals and then heating said linear polyester, in a molten condition, with decamethylene glycol in an amount approximately equivalent to the molecular excess of isophthaloyl chloride to form a superpolyester.

6. A method of producing a superpolyester which comprises heating terephthaloyl chloride with from 90 to 98 percent of an equimolecular proportion of tetramethylene glycol to form a linear polyester having terminal acid chloride radicals and then heating said linear polyester, in a molten condition, with a different glycol in an amount approximately equivalent to the molecular excess of terephthaloyl chloride, said latter glycol being selected from the group consisting of aliphatic hydrocarbon, oxahydrocarbon and thiahydrocarbon glycols having more than four atoms in the molecule chain between the hydroxyl groups, to form a superpolyester.

7. A method of producing a superpolyester which comprises heating isophthaloyl chloride with from 90 to 98 percent of an equimolecular proportion of tetramethylene glycol to form a linear polyester having terminal acid chloride radicals and then heating said linear polyester, in a molten condition, with a different glycol in an amount approximately equivalent to the molecular excess of isophthaloyl chloride, said latter glycol being selected from the group consisting of aliphatic hydrocarbon, oxahydrocarbon and thiahydrocarbon glycols having more than four atoms in the molecule chain between the hydroxyl groups, to form a superpolyester.

8. A method of producing a superpolyester which comprises heating terephthaloyl chloride with from 85 to 99 percent of an equivalent proportion of tetramethylene glycol to form a linear polyester having terminal acid chloride radicals and then heating said linear polyester, in a molten condition, with hexamethylene glycol in an amount approximately equivalent to the excess of terephthaloyl chloride to form a superpolyester.

9. A method of producing a superpolyester which comprises heating isophthaloyl chloride with from 85 to 99 percent of an equivalent proportion of tetramethylene glycol to form a linear polyester having terminal acid chloride radicals and then heating said linear polyester, in a molten condition, with hexamethylene glycol in an amount approximately equivalent to the excess of isophthaloyl chloride to form a superpolyester.

10. A method of producing a superpolyester which comprises heating a dibasic acid chloride selected from the group consisting of terephthaloyl chloride and isophthaloyl chloride with from 85 to 99 percent of an equivalent proportion of tetramethylene glycol to form a linear polyester having terminal acid chloride radicals and then heating said linear polyester, in a molten condition, with pentamethylene glycol in an amount approximately equivalent to the excess of acid chloride to form a superpolyester.

PAUL J. FLORY.
FREDERICK S. LEUTNER.

REFERENCES CITED

The following references are of record in the file of this patent:

UNITED STATES PATENTS

| Number | Name | Date |
|---|---|---|
| 2,437,046 | Rothrock et al. | Mar. 2, 1948 |
| 2,465,319 | Whinfield et al. | Mar. 22, 1949 |

FOREIGN PATENTS

| Number | Country | Date |
|---|---|---|
| 63,874 | Denmark | Aug. 27, 1945 |